(12) United States Patent
Theimer et al.

(10) Patent No.: US 7,689,638 B2
(45) Date of Patent: Mar. 30, 2010

(54) METHOD AND DEVICE FOR DETERMINING AND OUTPUTTING THE SIMILARITY BETWEEN TWO DATA STRINGS

(75) Inventors: Wolfgang Theimer, Bochum (DE); Andree Ross, Lünen (DE)

(73) Assignee: Nokia Corporation, Espoo (FI)

( * ) Notice: Subject to any disclaimer, the term of this patent is extended or adjusted under 35 U.S.C. 154(b) by 1207 days.

(21) Appl. No.: 10/534,007

(22) PCT Filed: Nov. 28, 2002

(86) PCT No.: PCT/IB02/04990

§ 371 (c)(1), (2), (4) Date: May 5, 2005

(87) PCT Pub. No.: WO2004/049240

PCT Pub. Date: Jun. 10, 2004

(65) Prior Publication Data

US 2006/0117228 A1 Jun. 1, 2006

(51) Int. Cl.
*G06F 17/15* (2006.01)
(52) U.S. Cl. ..................................... 708/422
(58) Field of Classification Search .............. 708/422
See application file for complete search history.

(56) References Cited

U.S. PATENT DOCUMENTS 4,845,610 A * 7/1989 Parvin .......................... 712/17
5,020,113 A * 5/1991 Lo et al. ...................... 382/209
5,402,339 A    3/1995 Nakashima et al.
5,874,686 A * 2/1999 Ghias et al. ................... 84/609
7,310,600 B1 * 12/2007 Garner et al. ................ 704/234

FOREIGN PATENT DOCUMENTS

EP 1093109 4/2001

OTHER PUBLICATIONS

"Music Audio Characteristic Sequence Indexing for Similarity Retrieval;" Cheng Yang; MACS; IEEE Workshop on Applications of Signal Processing to Audio and Acoustics, Oct. 21-24, 2001; New York; p. 3, subsections 2.3-2.4, Figure 5 and abstract.

(Continued)

*Primary Examiner*—Chuong D Ngo
(74) *Attorney, Agent, or Firm*—Alfred A. Fressola; Ware, Fressola, Van Der Sluys & Adolphson LLP (57) ABSTRACT

The present invention discloses a method and device for determining and outputting a similarity measure between two data strings each data string comprising data entities, comprising: receiving a first data string, receiving a second data string, which is characterized by determining consecutively following data entities in the first data string, determining the relative positions of the consecutively following data entities in the first data string, determining similar data entities with the same order in the second data string, determining the relative positions of the determined data entities in the second data string, determining a matching measure by determining how far the relative positions of data entities in the second data string match with the relative positions of consecutively following data entities in the first data string, and outputting a similarity measure which corresponds to the matching measure of at least one comparison result.

16 Claims, 6 Drawing Sheets

OTHER PUBLICATIONS

"SEMEX—An Efficient Music Retrieval Prototype"; K. Lemstrom, et al; retrieved from Internet on Jun. 11, 2003; p. 2, section 2 through p. 4, section 3 and abstract.

"Approximate String Joins in a Database (Almost) for Free;" Gravano et al; proceedings of the 27$^{th}$ VLDB Conference, Rome, Italy, 2001; retrieved from Internet on Jun. 11, 2003; abstract and whole document.

* cited by examiner

Fig. 1A

Similar structure of two copmpared strings $S_1$ and $S_2$:

⇨ Positions define an order of elements within sequence!

METHOD AND DEVICE FOR DETERMINING AND OUTPUTTING THE SIMILARITY BETWEEN TWO DATA STRINGS

CROSS REFERENCE TO RELATED APPLICATIONS

This application is for entry into the U.S. national phase under §371 for International Application No; PCT/IB02/004990 having an international filing date of Nov. 28, 2002 and from which priority is claimed under all applicable sections of Title 35 of the United States Code including, but not limited to, Sections 120, 363 and 365(c).

TECHNICAL FIELD

The present invention relates to the field of one-dimensional pattern recognition. It also relates to a robust pattern recognition for fault-tolerant string or sequence search applications with a minimized use of calculation power. More specifically the invention relates to a simple fault tolerant string comparing algorithm. The presented invention introduces a method and a device that measures the similarity of two sequences or strings in a very fault-tolerant manner. The invention is for special use in the field of mobile terminal devices.

BACKGROUND OF THE INVENTION

In pattern recognition and signal processing information is classified according to general categories, all of them having different sets of theories and algorithms to handle them. Two classifications of relevance for this invention are:
a) The dimensionality of the signals to analyze:
   One-dimensional signals are quite widespread. Examples are audio signals or any time series of one variable.
   Two-dimensional signals are e.g. images which have two spatial dimensions.
   Examples of three-dimensional signals are video signals which add the time dimension to an image signal.
b) Discrete or continuous signals:
   A signal can assume any real or complex value in each of its dimensions or show only discrete (quantized) values. The discretization can happen on two levels:
   The signal is only known at discrete spots of one or more dimensions, i.e. the signal is sampled.
   The values of the signal are quantized.

The present invention preferably relates to discrete one-dimensional signals which are sampled and quantized.

The most common way to solve the problem of fault-tolerant search was the application of the so-called "edit distance" in combination with dynamic programming (DP). The edit distance is a measure or dimension that describes the distance between two strings $S_1$ and $S_2$. The distance is defined to be the number of insertions, deletions and variations that are required to transform e.g. a string $S_1$ into a string $S_2$. These required transformations are computed by applying the idea of dynamic programming, which is commonly based on a "divide-and-conquer" algorithm:

A divide-and-conquer algorithm subdivides the original problem into smaller independent problem partitions and tries to find a solution for those smaller partitions first. In the following steps the divide-and-conquer algorithm tries to solve the problem for bigger partitions by taking and combining the solutions of the already edited smaller problem partitions. Finally, the algorithm tries to combine these solutions to find a solution for the original problem without any partitioning.

The implementation of an edit distance in combination with dynamic programming (DP) is strictly dependent on the problem context it is applied in. In most cases the implementation cannot be kept untouched if the problem context changes, because the implementation of the edit distance is usually specialized for a particular problem context. Especially the realization of a Dynamic Programming (DP) algorithm is in most cases highly specialized for the particular problem. Two essential problems may arise in the context of DP:

1.) Not every problem can be partitioned so that it can be solved with DP.
2.) The number of conceivable problem partitions is too great. The runtime of DP would not be very convenient as an obvious consequence.

In the context of a fault-tolerant search, the edit distance represents in combination with DP a specialized solution to measure the similarity of two strings $S_1$ and $S_2$. It is obvious that especially under consideration of 2.) some preconditions need to be defined to apply the edit distance in an acceptable runtime if the following faults occurring during comparison of $S_1$ and $S_2$ shall be tolerated:
Characters of the string may (however) be varied
Additional characters may (wherever) be inserted
Characters may (if any and wherever) be missing
Many possibilities exists to define preconditions to keep the runtime low, but in most cases either the tolerance or the search accuracy increases anyhow.

Such a method is e.g. disclosed in the European Patent Application EP 1 093 109 A1 "Verfahren zum Erkennen und Auswählen einer Tonfolge, insbesondere eines Musikstücks". In this document a method is disclosed to compare a first sequence of notes with a second sequence of notes, to determine the similarity between said two sequences. The disclosed method is based on a median and on comparing the tone duration and the variation of adjacent successive tones in both sequences.

SUMMARY OF THE INVENTION

So it is desirable to improve the present pattern recognition techniques by increasing the robustness of existing string and sequence comparison techniques.

It is further desirable to reduce the search time of an algorithm as compared to present similarity determination algorithms.

This invention presents a general similarity measure that is easily applicable to a great number of independent problem contexts without many changes. The runtime is only dependent on the number of characters the search string S is composed of. In contrast to an edit distance (in combination with DP) the runtime is only effected by the defined tolerance concerning variances, because it is not affected by a tolerance in matters of insertions and deletions.

The present invention is based on comparing the order of two strings by uniquely identifying the entities in both strings and subsequently comparing the order of the unique entities. The order is identified preferably by tuples comprising two or more entities. The tuples of the entities define a relationship between the entities. The more identical tuples can be found in both strings the higher the level of similarity of both strings is.

According to a first aspect of the present invention there is provided a method for determining the similarity measure between two data strings of data entities, values or elements. The method. comprises receiving two strings to be compared. The method is characterized by determining consecutively following data entities in said first data string, determining the relative positions of said consecutively following data entities in said first data string, determining similar data entities with the same order in said second data string, determining the relative positions of said determined data entities in said second data string, determining a matching measure by determining how far the relative positions of data entities in said second data string match with the relative positions of consecutively following data entities in said first data string, and outputting a similarity measure which corresponds to the matching measure of at least one comparison result.

The method further comprises determining the relative position of the consecutively following data entities, preferably in all possible tuples and determining the number of similar data entities, particularly tuples in the second string, as a similarity level, and outputting said similarity level. Preferably, the tuples can be pairs, triples, quadruples or n-tuples, wherein n defines a number of entities in the tuple. The present invention is based on relationships between different entities, preferably defined by said tuples, and therefore one-tuples comprising only one entity can not be used in the present invention.

The reception of the first and second string of entities or values, can further comprise a preprocessing of at least one of said strings e.g. by signal enhancing, quantifying, sampling or by retrieving said string from a storage or any other signal or string source. The entities in said string can represent any set of entities such as characters notes, digitized signals, music or gene sequences, values, chemical compositions and the like. Said second string of entities is usually retrieved from a pre-stored string library, but can also be retrieved from a second signal source to determine a correlation between two signals.

By determining at least one tuple or a pair of consecutively following data entities in said first data string, a parameter of order in the first string is generated. It may be noted that (the tuples of) consecutive entities are not limited to tuples of directly consecutive entities.

By determining the relative position of said (at least one tuple of) consecutively following data entities in said first data string, the method defines an order of said entities. This order is very clear in the case of 2-tuples, i.e. pairs, where it can be seen if one entity is positioned before or after the other entity in the string.

Similar to the determination of data entities or tuples in the first string, at least one similar sequence of data entities or tuples of similar consecutively following data entities in said second data string and the relative position of said similar consecutively following data entities in said second data string are determined.

By determining a matching measure by comparing how far the relative positions of the at least one tuple of similar consecutively following data entities in said second data string matches with the relative position of said at least one tuple of consecutively following data entities in said first data string it can be determined how far the order of the first string can be found in the second string. The order corresponds to a similarity of both strings, and in case that in both strings the same tuples can be found, and that all found tuples have the same relation or succession of the entities, the whole strings have to be identical.

Thereafter, the number of matching (n-tuples of) data entities which are matching in respect of their relative order with said determined n-tuples in said first string, is determined in said second string. Said number of data entities (tuples) represents a matching measure. The matching measure describes the similarity of the order of the strings. It is clear that strings being shorter than the used n-tuple can not be compared with the present method. The present invention proposes a method that measures the similarity of two sequences or strings $S_1$ and $S_2$ in a very fault-tolerant manner.

Finally, the method puts out a similarity measure which corresponds to the matching measure of at least one comparison result. The similarity measure represents an additional quality in relation to the number of found matching tuples. The matching measure is e.g. dependent of the absolute number of tuple in the strings, and the matching measure can represent a normalized value, to provide a string length independent similarity measure, level or value.

The outputting of the similarity level can comprise a transformation into a digital form. The determined similarity level can be outputted together with the first and/or the second string of entities. This single output of the determined similarity level can e.g. be used in an online monitoring application, wherein two signals are compared.

It outlines a new robust pattern recognition scheme and its applications based on an ordering principle. The advantage of the method is that it shows fault-tolerance search capabilities in the realistic scenario and that the search pattern and the data can account for:

Substitution errors: Entities at certain positions differ between search pattern and reference pattern.

Insertion/deletion errors: The search pattern does not have the same length as the reference pattern since some entities are missing or are additionally in the reference pattern.

An example embodiment of said n-tuples are 2-tuples i.e. pairs. The present method comprises the output of said determined similarity level. For a string with n entities a total of $n \cdot (n-1)/2$ pairs are possible and determined in their order in correspondence with their above mentioned position in the string. The similarity level describes the similarity of the order of the strings. It is clear that in case of pairs, a one-element string of a single entity cannot be compared with the present method.

Yet another example embodiment of the method further comprises the determination of at least one error limit for at least one of said entities. Further said error limit is considered during said determination of said matching measure. The error limit can be a universal error limit assuming that each value of one of said strings is sampled with e.g. a one-bit sample uncertainty. The error limit can be an individual pre-stored error limit for only a small number of entities.

This uncertainty can be considered during the generation of said matching tuples, i.e. two entities in said two strings are considered as being matching, if they differ less than said error limit. This first approach has the advantage that the number of tuples is not increasing, but has the drawback that directly consecutive values lying within said error limit may become indistinguishable. The first approach on basis of the entities has the advantage to be adapted for large error limits. It is to be noted that the error limit should be considerably smaller than the range of possible values of said entities. The first approach is best be used in case of strings of values with very different entities, and large error limits. So tuples of entities are considered as matching, if both values differ less than said universal error limit.

A second approach to consider said error limits can be to form a number of tuples comprising all said values for an entity within said error limits. This leads to a large number of tuples, as for example an error limit of minus 1-bit lead to a combination of 4 possible pairs. In case of pairs the number of possible pairs with a +/− 1-bit error limit is already 9. This approach is the best for small tuples such as pairs, and small, error limits not more than +−1 digit, or individual error limits for each of said entities.

Said error limits can be universal error limits or systematic errors as e.g. caused by preprocessing or signal/string transfer. The error limits can also be statistical error limits determined by error calculation or statistical values. The error limits can be empirically determined error limits, that may be determined separately for each entity or range of entities. In case of hummed music recognition empirically determined values may be used to compensate for typical perceptual misinterpretations of tone height, tone lengths or other properties of said entities.

The error limits may be considered during said determination of said matching measure, by simply ignoring the error limits and considering said entities within said error limits as being similar, identical or valid. The error limits can also be considered during the determination of said matching measure, as a value describing the actual distance between the values in both strings divided by a maximum error limit. The matching measure can also be generated as a multi dimensional value, wherein the similarity is generated as a tuple or as a vector describing the order criterion in one value and the "erroneousness" in another value. The resulting matching measure of the calculated similarity measure may be calculated as the arithmetic or geometric mean or a mean square distance of said similarity value. Alternatively, other mapping functions defining upper limits for at least one of said values can be applied.

Another example embodiment of the method further comprises the storing of said second string together with said similarity level and/or said first string of entities. In case that more than one second strings are stored, the second strings can be sorted in accordance with their respective values of similarity, to simplify the access to a most similar string.

Yet another example embodiment of the method further comprises allocating a position label or value to each of the entities in the string, and numbering same entities according to their relative position in accordance with the position label, i.e. the first, second and third . . . occurrence of an entity.

The assignment or allocation of a position label to each of said entities in each of said strings, is a prerequisite for the following numbering of equal entities In case that the entities are already assigned with an internal string position indicating set of numerals the assignment can comprise the adoption of said position.

The same entities or values in a string are numbered consecutively according to their relative succession in said string according to said positioning labels, i.e. by first, second, third . . . occurrence labels. By numbering consecutively identical entities in the string, according to the position labels in the string, each entity is uniquely identified. So the method provides an unambiguous order to the string and to similar entities within said string. Thereby the same entities in the string can be distinguished. Said numbering is carried out in each of said strings respectively.

After the numbering, the relative order for all possible n-tuple of unique entities (i.e. all possible combinations of two, three or four entities) in one of the strings is determined. It may be noted that all possible n-tuples of unique entities and not only n-tuples of adjacent entities are determined in their relative order. By determining in said second string the number of n-tuples of numbered entities which in respect to their relative order are matching said determined n-tuples of entities in said first string, the degree of similarity is determined.

The similarity level is related to the unique entities in the n-tuples and to the succession of the entities in said string. The same relative succession analysis can also be performed in the second string for the determination followed by a comparing step of the two sets of n-tuples. The total amount of identical n-tuples in both strings defines the similarity level. This level can be standardized by dividing the total amount of equal n-tuples by the maximum number of possible n-tuples of entities in said first or said second string.

Another example embodiment of the method further comprises determining the distances between said two entities of said least one pair of consecutively following data entities in both said data strings and determining a difference between said first and second distances for similar pairs, and considering said difference during said determination of said matching measure.

By determining the distance between said two entities of a pair entities in said first data string, said pair is further characterized by the number of entities between said two entities. Thereby an additional parameter to describe the relation between two entities can be generated. Two pairs are more similar, if the distance between its entities is more similar. If both pairs of entities have the same distance between their entities, it is clear that the pairs are more similar than if a pair of directly consecutive entities is compared with a pair of similar entities being spaced by 20 or more entities.

As illustrated in the above description of the error limit, this additional position difference parameter can be considered in said determination of said matching measure. As stated above, the matching measure can be generated as a tuple comprising the order characteristic, the error limits and the distance difference. An exemplary mapping function is described in the description of the figures.

Yet another example embodiment of the method further comprises the determination of a threshold for said similarity level and the outputting said second string, if said determined similarity level at least equals said threshold. By using a threshold, the rejection of too different strings can be simplified. The threshold can be received from a user or from a storage. The threshold can be differently selected for each of the second strings, to provide an evaluation of the similarity of said second string. This can be a useful feature for the search of a first small string in large second strings.

Yet another example embodiment of the method further comprises: repeating said determination of the similarity level with a number of second strings and determining said threshold in correspondence with a maximum or minimum number of second strings to be outputted. By using such an adaptive threshold the number of outputted values can be defined in accordance with a pre-selectable number of most similar strings.

Another example embodiment the method further analyzes the first string for entities not present and suppresses or deletes all said entities in the second string, that are not present in said first string. By suppressing of entities in the second string the recognition process can be made faster. The suppression leads to a fragmentation of the second string. Similarly, the entities in the first string that are not present in the second strings can also be deleted for the present method to speed up the recognition process. This can be done by determining a first set of entities of the first string, and determining all entities in the second string being not present in the first string. As both sequences are quantized, the missing entities can easily be determined. This deletion of elements in the first and/or in the second string leads to a consideration of only the subset of entities of the common members of the entities of the first and the second string.

Yet another example embodiment of the method further determines the number of entities that are present in the second string, but that are not present in the first string, as a second similarity level. This additional value can also be standardized and can serve as an additional value that can e.g. be multiplied with said first similarity value. The number of deleted entities can be divided by the total amount of entities in the first or the second string to provide an evaluation of the number of deleted entities in.

Another example embodiment of the method further comprises determining a fraction within said second string comprising at least the same number of common entities that are simultaneously present in both strings. The number can be determined by the total number of entities within the second string or by the respective number of different entities in the first string. By using such a process to determine the length of the second string it can be assured that errors in the second string caused by additional entities not present in the first string can be filtered out.

Yet another example embodiment of the method further marks all tuples of numbered entities being identical to said determined tuples of said in said first string having the same succession as in the first or second string and stores said string with said marked tuples. By marking the entities in the string the sections within the second string having high similarity to the first can be marked to determine the similar strings within said second string.

It should be noted that in the case that the first string is small and the second string is large, the second string can be preprocessed by an auto-similarity algorithm, to detect repeated sub-strings within the second string. This feature can be especially useful in the case of music searches from a tone string. The second string can be searched for similar strings such as refrains to cut down the whole piece of music to at least the half.

According to yet another aspect of the invention, a software tool is provided comprising program code means for carrying out the method of the preceding description when said program product is run on a computer or a network device.

According to another aspect of the present invention, a computer program product downloadable from a server for carrying out the method of the preceding description is provided, which comprises program code means for performing the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of the method contained in the preceding description, when said computer program is run on a computer or a network device.

According to yet another aspect of the present invention an electronic device for determining the similarity between two data strings of data entities is provided. The electronic device comprises a component for receiving, a processing unit and an interface.

The component for receiving is for receiving a first string of entities and a second string of entities. The component for receiving can be embodied as a single interface or input module or as two different interface modules for receiving said two strings. The interface module can further comprise a quantifier such as an analog digital converter to provide a string even from an arbitrary analogue signal. The component for receiving can also comprise an interface to receive said first or second signal from a storage.

The processing unit is connected to said receiving component. The processing unit is configured to determine at least (one tuple of) consecutively following data entities in both of said strings. Said processing unit is further configured to determine the relative position of said at least one tuple of consecutively following data entities in both of said data strings. Said processing unit is configured to determine a matching measure by comparing how far the relative positions of the at least one tuple of similar consecutively following data entities in said second data string matches with the relative position of said at least one tuple of consecutively following data entities in said first data string. Said processing unit is further configured to output a similarity measure which corresponds to the matching measure of at least one comparison result. The processing unit can further be configured to execute the processes of the preceding description.

The interface is connected to said processing unit for outputting said similarity level. The interface can further serve for outputting said first and/or second string. The interface can also serve for outputting said strings.

Yet another example embodiment of the electronic device further comprises a storage that is connected to said processing unit for storing received strings and said determined levels of similarity. The storage can also be used to retrieve prestored strings from.

This implementation is (with some transformations) also applicable in all technical fields wherein strings of quantized values have to be compared with others. For example the following exemplary fields of applications among others, which are explained more in detail in the description of the figures:

Associative text string search
Genome analysis
Speech recognition
Musical melody search

BRIEF DESCRIPTION OF THE DRAWINGS

In the following, the invention will be described in detail by referring to the enclosed drawings in which.

DETAILED DESCRIPTION

Figure 1A:
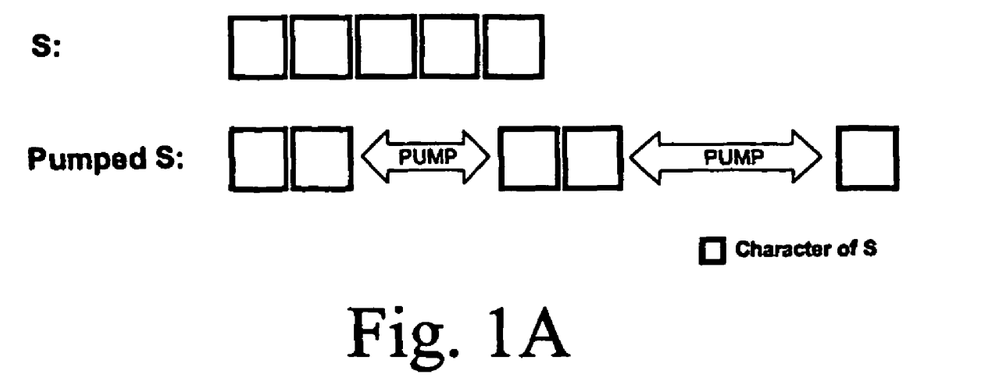
FIG. 1A visualizes the recognition of a pumped sequence, not affecting the recognition result, FIG. 1B visualizes the recognition of a pumped sequence and the effects to the recognition result.
Figure 1B:
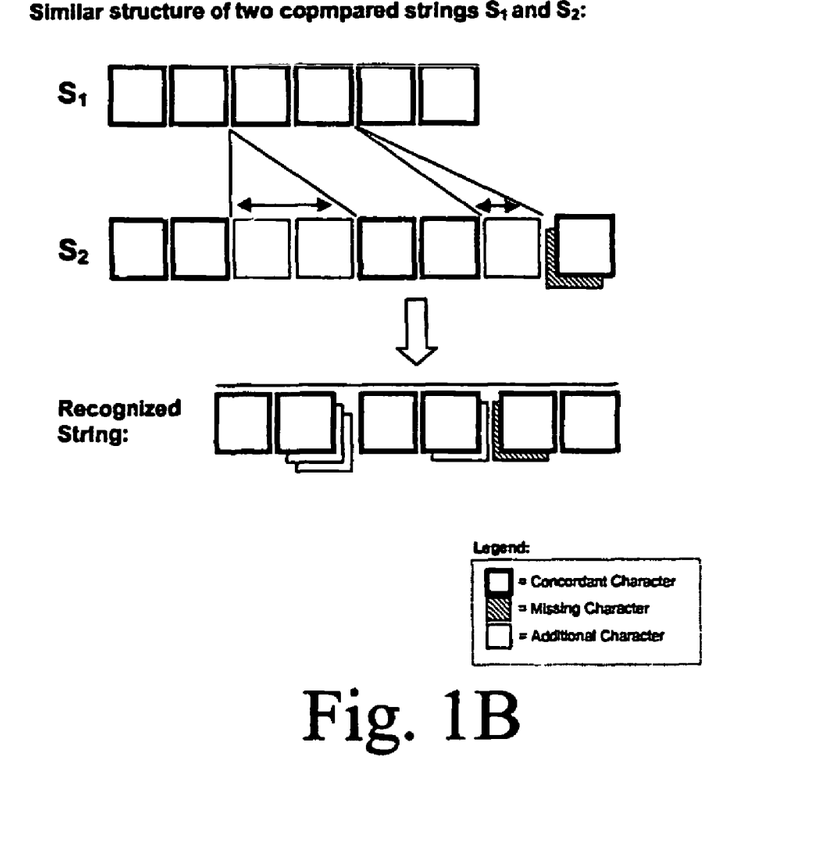

FIG. 1A visualizes the recognition of a pumped sequence, not affecting the recognition result and FIG. 1B visualizes the recognition of a pumped sequence and the effects to the recognition result. The presented invention introduces a method that measures the similarity of two strings or sequences $S_1$ and $S_2$ in a very fault-tolerant manner. If the sub-string $S_1$ shall be recognized in $S_2$, this method is capable of recognizing similar (respectively identical) string structures in $S_2$. The invented method is very robust due to insertions and deletions. Additional (and vice versa missing) characters are tolerated in such a manner that a similar (or identical) sub-string can be pumped by blank insertions (s. FIG. 1A) or by non blank insertions (s. FIG. 1B) but it is still recognized as similar (respectively identical) sub-string.

Figure 1C:
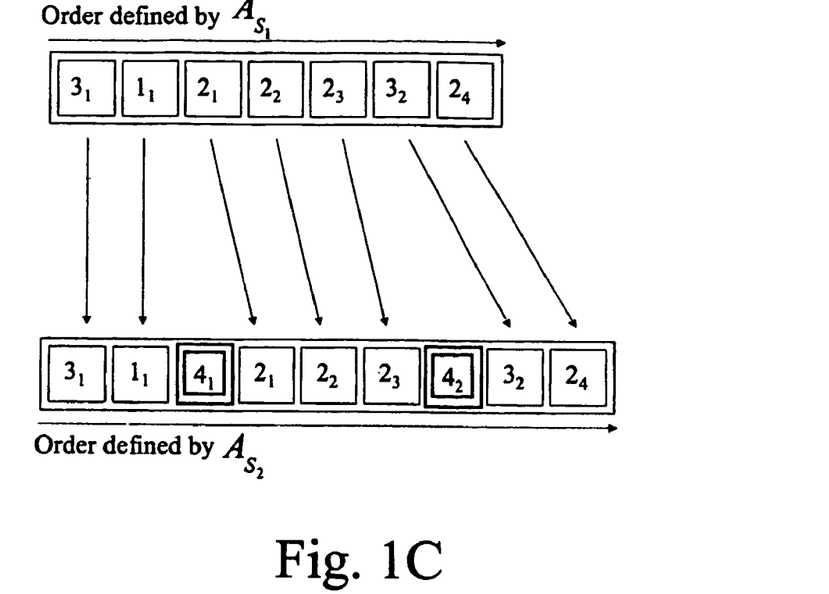
FIG. 1C is an example for a similarity algorithm and the effects of different values in both sequences.

FIG. 1C depicts a similarity measure according to the present invention, which is based on the principle of order relationships. The elements of a string S define an order by their fixed positioning within the string S. The basic principle of the invented measure is based on the analysis if the relative positioning of two elements of $S_1$ is also recognizable in the compared string $S_2$. Two elements $a_i$ and $a_j$ of $S_1$ are related to each other if they are positioned "one after another". The order relation between $a_i$ and $a_j$ points out information about the elementary order structure. This structure information is transferable to all elements (in $S_1$) positioned "one after another", so that the sequence of $S_1$'s elements defines an order due to the position of the elements. The invented similarity measure describes therefore how many elements of $S_2$ are also positioned "one after another" as defined in $S_1$. The more elements of $S_2$ are relatively positioned the same way as in $S_1$, the more similar are the sequences as a consequence.

This includes that the two sequences to be compared can have a different length, which increases speed of the recognition process. A method to determine the length of the second string section to be compared will be presented in the following in the discussion of FIG. 1C.

An often encountered problem is to find a sequence of (quantized) values, in the following called search string, in a large set of information. Examples of search strings can be strings such as text strings, melodies consisting of musical notes or genome sequences. These strings are transformed into a sequence by adding an index to each symbol which is equal to the number of its repetitions since the beginning of the string. The string S=(1 3 2 1 1 2) e.g. is transformed into the sequence $A_S=(1_1 3_1 2_1 1_2 1_3 2_2)$.

FIG. 1C visualizes the set problem: Two sequences $A_{S_1}$ and $A_{S_2}$ are compared where the search sequence $A_{S_1}$ is shorter than the reference sequence $A_{S_2}$ due to two insertions ($4_1$ and $4_2$) in $A_{S_2}$ depicted in a bold double box. The similarity measure provides the same result, irrespective of the insertions since the order of the existing elements of $A_{S_1}$ is completely preserved and visualized by the arrows for the mapping.

The order of subsequent symbols in the search string is compared with the order of the same symbols in the database string. The different instances of one symbol are numbered (e.g. $3_1$ for the first occurrence of 3 and $3_2$ for the second occurrence of 3) in order to distinguish between identical symbols in the strings. If the same order relationship exists in search and database string the similarity count is increased, otherwise it is left unchanged. In the example of FIG. 1 this means concretely:

The similarity count is increased by 6 since in both strings $1_1$ follows $3_1$, $2_1$ follows $3_1$, $2_2$ follows $3_1$, $2_3$ follows $3_1$, $3_2$ follows $3_1$ and $2_4$ follows $3_1$.

Then the similarity count is increased by 5 since in both strings $2_1$ follows $1_1$, $2_2$ follows $1_1$, $2_3$ follows $1_1$, $3_2$ follows $1_1$ and $2_4$ follows $1_1$.

The similarity count for orders after $1_1$ follows the same rules and adds further 4+3+2+1 to the similarity count.

The final similarity count is 21. It is normalized by the maximum achievable similarity count which is $N(n-1)/2$ for a search string of length n. This leads to a similarity range of [0,1]. In our example (n=7) the normalized similarity is $21/21=1$ which shows maximum similarity. If you would do the same similarity computation for the text strings "example" and "pleasure" which is $4/21$ this shows the differences, but at the same time demonstrates that certain letters of the two strings have the same order. Therefore the similarity measure is not zero. The similarity is of course zero if completely different character symbol sets are compared. The similarity is equally zero if only one common entity or character symbol occurs only once in one of said sequences. In this case no matching pair of character symbols can be found, as all possible pairs contain at least one character symbol not present in the other sequence.

Figure 1D:
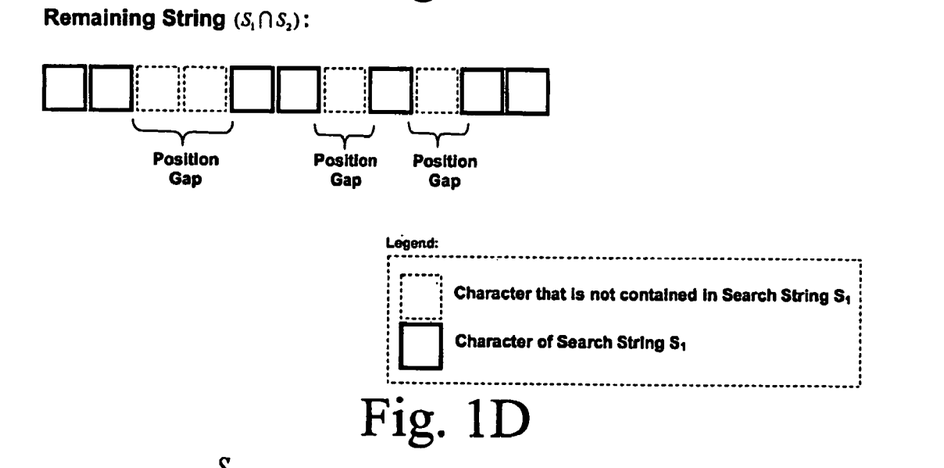
FIG. 1D is an example for sequence fragmentation according to a search sequence.

FIG. 1D shows an additional criterion to analyze two sequences for their similarity: The fragmentation of a sequence (due to the characters of a search string). Considering the situation that two strings $S_1$ and $S_2$ shall be analyzed for their similarity: If now all characters of $S_2$ are deleted that are contained in $S_2$ but not in $S_1$, it is obvious that the resulting string may be very fragmented, because many of the characters may have been deleted between the remaining characters. The string $S_{remaining}$ (that is containing the remaining characters) is equivalent to the intersection of both strings $S_1$ and $S_2$ with $S_{remaining}=S_1 \cap S_2$. It is also obvious that the sum of all position gaps (caused by deleted characters) is correlating to the similarity of $S_1$ and $S_2$. A position gap is the number of deleted characters between two remaining characters. The lower the sum of positions gaps (i.e. deleted characters) the higher is the probability for a higher similarity of $S_1$ and $S_2$. This criterion is also very robust due to fault-tolerances.

If the order measure is combined with the fragmentation measure, a powerful and fault-tolerant similarity measure is possible in a very fast runtime, because both criteria can be implemented very efficiently.

Figure 2:
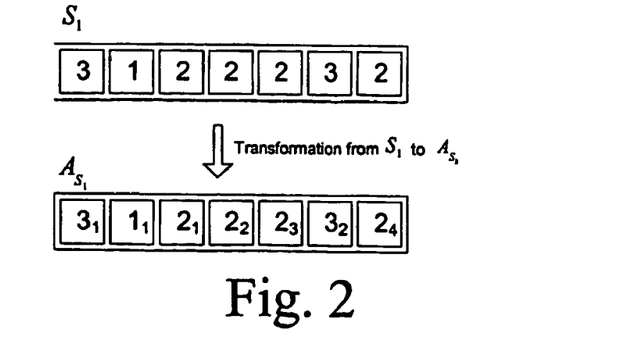
FIG. 2 depicts the transformation of an arbitrary sequence $S_1$ into a unique value notation $A_{S_1}$, FIG. 3 depict two sequences that are to be analyzed for their similarity.

FIG. 2 shows a. more detailed description of the search algorithm according to the present invention. Two sequences $S_1$ and $S_2$ will be transformed into the equivalent sequences $A_{S_1}$ and $A_{S_2}$ before they are analyzed for their similarity, because in contrast to $S_1$ and $S_2$ the notation of $A_{S_1}$ and $A_{S_2}$ also takes the repetitions of an element into account.

This transformation of $S_1$ into $A_{S_1}$ represents a transformation of a group of similar values to an unique notation of each of said values by allocating an index to each of the same values, so that each value in the string can be recognized individually by its value and its position index.

The transformation is unambiguous but not a one-to-one, as from the position in the string the index of each of the values can be derived, but the position of the value in the sequence can not solely be derived from the value and its index.

Figure 3:
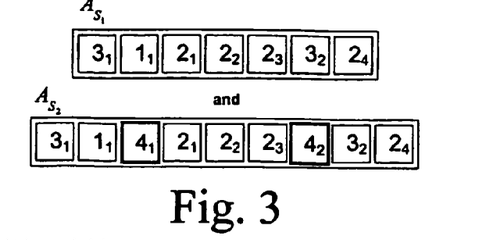

FIG. 3 depicts two sequences $A_{S_1}$ and $A_{S_2}$ to be analyzed for their similarity. The sequences $A_{S_1}$ and $A_{S_2}$ are composed of elements. The notation of every element is defined by the following definition (1) of a sequence $A_S$ with unique elements $a_i$ $$A_S = a_1, a_2, \ldots a_{l(S)} \text{ with } a_i \in IN_{IN} = (IN, IN)$$

$$\text{Let } a_1 = (f_i, r(f_i)) = (f_i)_{r(f_i)}$$

with $f_i \in IN$ and $r$ as repetition of $f_i$

The present algorithm of this similarity measure is based on an order definition. The idea is very simple: Define a definite order according the elements' position within the sequence.

Figure 4:
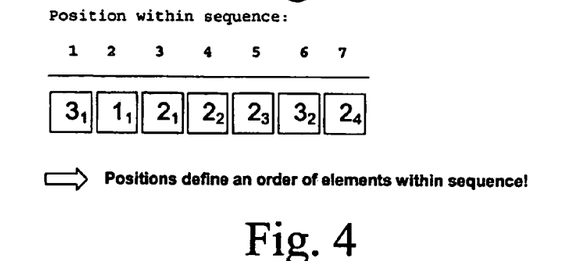
FIG. 4 shows a sequence $A_S$ defining an order based on the position of the elements in the sequence, FIG. 5 visualizes an order application.

FIG. 4 shows the definition of a given sequence of $A_{S_1}$ defining a unique order. Above the line the position of each value within the sequence is depicted by the natural numbers 1 to 7. Below the lines the appearance of each single entity is numbered by an index of natural numbers, based on the positions of the entities.

The position $p(a_i)$ of every element $a_i$ defines the determined position of this element within the sequence:

$$\text{Let } p(a_i) = i \text{ with } a_i \in A_S$$

$$\text{It follows } p(a_1) < p(a_2) < \ldots < p(a_{l(S)})$$

By defining a fixed order position for every element, a relationship between two elements is also given by the definition below, wherein two elements are related to each other if the relative order is kept.

Let R be a relation that is defined as follows:

$$R = \{(a_i, a_j) | a_i, a_j \in A_S \text{ with } p(a_i) < p(a_j)\}$$

This relationship points out that two elements $a_i$ and $a_j$ of $A_{S_1}$ are related to each other if their relative positioning within $A_{S_1}$ is kept. The order relation between $a_i$ and $a_j$ points out an information about the elementary structure. This structure information is transferable to all elements (in $A_{S_1}$) positioned "one after another", so that the sequence of $A_{S_1}$'s elements defines an order due to the elements' positioning. The invented similarity measure analyzes therefore how many elements of $A_{S_2}$ are also positioned "one after another" as defined in $A_{S_1}$. The more elements of $A_{S_2}$ are (relatively) positioned the same way as in $A_{S_1}$, the more similar are the sequences as a consequence.

In case of the above given definition two elements are related to each other if the position of any arbitrary left element $a_i$ is smaller than the position of the right element $a_j$ (with $p(a_i) < p(a_j)$).

The similarity of $A_{S_1}$ and $A_{S_2}$ can now easily be measured by applying the order of $A_{S_1}$ on $A_{S_2}$. By applying an order of a sequence (e.g. $A_{S_1}$) on another sequence (e.g. $A_{S_2}$) it will be checked how many order relationships defined by $A_{S_1}$ are also kept by the elements in $A_{S_2}$. The order of $A_{S_1}$ defines as already mentioned a relationship between the elements' positions within the sequence $A_{S_1}$. The similarity measure according to the invention now checks how many times the order (defined by $A_{S_1}$) can be detected in $A_{S_2}$. A relationship between two elements is kept when the relative positioning of these elements is the same in $A_{S_1}$ and $A_{S_2}$. A position transformation (from $A_{S_1}$ to $A_{S_2}$) is required to measure an order application.

Equation (1): showing the order application (here defined by $A_{S_1}$) into the context of $A_{S_2}$ (incl. position transformation):

$$\text{Check if } (p(a_i) < p(a_j)) \wedge (p(t(a_i)) < p(t(a_j)))$$

$$\text{if } a_{[i,j]} \in A_{S_1} \text{ and } t(a_m) = \begin{cases} n: \exists n \text{ with } a_m = a_n \text{ and } a_n \in A_{S_2} \\ \text{not defined if } a_m \notin A_{S_2} \end{cases}$$

A position transformation $t(a_m)$ simply searches the position of an element $a_m$ (of $A_{S_1}$) in $A_{S_2}$. Either the element $a_m$ is contained in $A_{S_2}$ (at position $n$,) and $t(a_m)$ returns the position of $a_m$ within $A_{S_2}$, or $a_m$ is not contained in $A_{S_2}$ and $t(a_m)$ signalizes that the relationship criterion cannot be kept.

Figure 5:
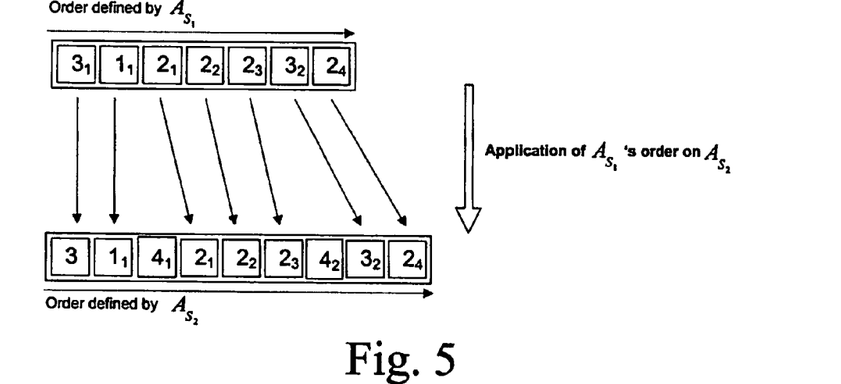

FIG. 5 visualizes the position transformation. The similarity measure for two arbitrary sequences $A_{S_1}$ and $A_{S_2}$ (that is completely based on the above explained ideas) is finally defined and summarized by the definitions and equations below.

Definition of the order relationship:

$$R = \{(a_i, a_j) | a_i, a_j \in A_{S_1} \text{ with } p(a_i) < p(a_j)\}$$

Check if order relationship is kept for two elements:

$$\omega(a_i, a_j) = \begin{cases} 1: (a_i, a_j) \in R \\ 0: ((a_i, a_j) \notin R) \vee (a_i \notin A_{S_1}) \vee (a_j \notin A_{S_1}) \end{cases}$$

Summarize all checks (for all elements):

$$s(S_1, S_2) = \frac{1}{\frac{1}{2} l(S_1)(l(S_1) - 1)} \sum_{i=1}^{l(S_1)-1} \sum_{j=i+1}^{l(S_1)} \omega(t(a_i), t(a_j)) \text{ with } a_{[i,j]} \in A_{S_1}$$

$$\text{and } t(a_m) = \begin{cases} n: \exists n \text{ with } a_m = a_n \text{ and } a_n \in A_{S_2} \\ \text{not defined if } a_m \notin A_{S_2} \end{cases}$$

Figure 6:
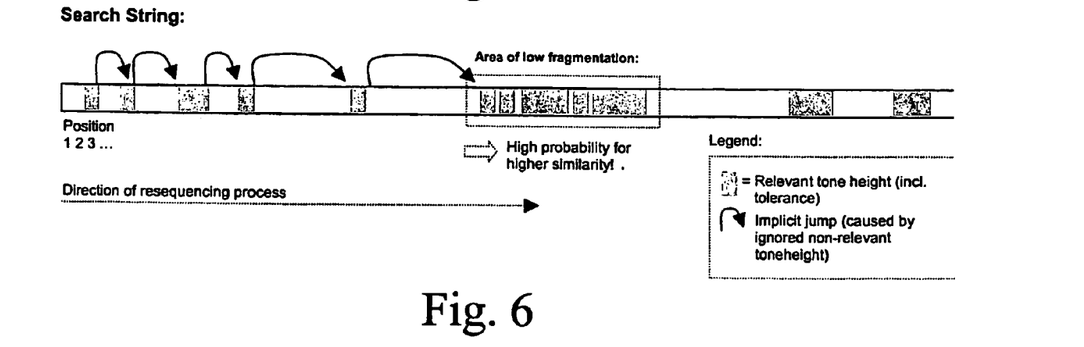
FIG. 6 is an example for the fragmentation of a sequence.

This invention presents the function $s(S_1, S_2)$ that measures the similarity of two sequences $S_1$ and $S_2$ as defined above. This function returns a value with the following properties:

$s(S_1, S_2) = 1$: $S_1$ is in total accordance with $S_2$ $s(S_1, S_2) = 0$: Absolutely no accordance between $S_1$ and $S_2$ $0 < s(S_1, S_2) < 1$: The value of $s(S_1, S_2)$ increases in parallel to an increasing similarity of $S_1$ and $S_2$ FIG. 6 depicts an example for the fragmentation of a sequence to reduce the processing time during the pattern recognition. The idea of the invention has been implemented in a fault-tolerant search technique for music sequences in multimedia databases. A hummed (and therefore faulty) melody is transformed to a complexity-reduced sequence of notes. This faulty note sequence is then given to the fault-tolerant search technique to search the music song the hummed melody belongs to. In this example embodiment of the present invention the recognition algorithm has been extended to improve its efficiency:

The efficiency according runtime and search accuracy can significantly be increased by an easy one-time preprocessing of the music database (the search algorithm will later search in). So far the notes of a song have been stored in a sorted sequence of notes. This sequence was in so far only dependent on the notes' position. If the structure of the stored sequence is changed in such a manner that the sequence is now ordered by the tone heights (followed by all positions the corresponding tone height occurs), the tone heights (and their positions) of a song can be accessed in a very fast (approximately logarithmic) runtime. This kind of selective tone height access enables the possibility only to focus on the relevant tone heights the search melody is composed of. All (non-relevant) tone heights that are not contained in the search melody can easily be ignored for the similarity measure. If the notes of the music database are stored in this manner, the notes need to be re-sequenced for a similarity analysis (after the relevant tone heights have been appointed on the basis of the search melody), because the original note sequence was ordered by the notes' position. The re-sequencing process can easily be realized by using FIFO (first-in-first-out) queues. Every relevant tone height represents a FIFO queue that is composed of the corresponding tone height's positions. If the FIFO queues are accessed in such a manner that always the FIFO queue with the lowest position (as first element) will be accessed, the note sequence automatically will be re-sequenced in the exact same manner of the original sequence. Non-relevant tone heights will be ignored.

If only relevant tone heights and their positions will be re-sequenced in the scope of a similarity measure, it is obvious that the re-sequenced note sequence is fragmented, because non-relevant tone heights and all their positions are completely ignored:

If now the distances are calculated on the basis of two directly sequenced relevant tone height positions which are stored in the already explained FIFO queues it is clear that these distances represent a measure for the fragmentation of a certain subsequence. This fragmentation also correlates with the probability for a higher similarity. If a certain subsequence is only barely fragmented (relating to the relevant tone heights of the search melody), it is clear that this subsequence is also a candidate for a higher similarity.

The elimination of non-occurring tone heights by the FIFO structure can be transferred to other discrete-valued sequences to speed up the search process.

If the described fragmentation criterion is combined with the already explained order criterion the search accuracy can be increased significantly. The explained one-time preprocessing of the music database increases the search runtime. The runtime can also significantly be decreased by a parallelization of the search process. All statements for tone heights (and their positions) due to fragmentation and pre-processing are also applicable for tone lengths.

Figure 7:
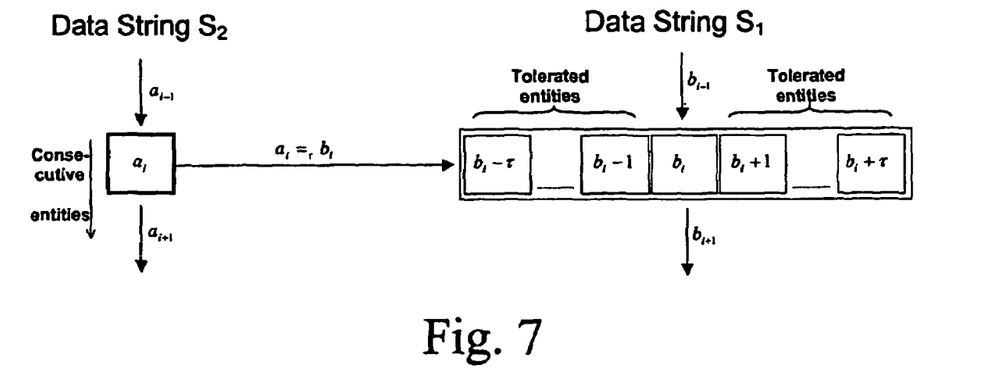
FIG. 7 is an example for the application of the present invention on strings that are probable faulty.

FIG. 7 depicts an improved version of the order criterion for the application on strings that are probably faulty. The above outlined methods assume that both strings are faultless. In case that it can be assumed that one or both of the strings to be compared are more or less faulty, it may be necessary to extend the methods to a more fault tolerant manner. So the single entities of both strings may be provided with a tolerance in the measurement of the single entities. It is e.g. clear that in the case of digitized values, there is always a one-bit element of uncertainty in the digital values. It can therefor be estimated that every value in the strings comprise a one bit uncertainty. This uncertainty can also be projected or mapped to one of the strings, by assuming that the first or the second string comprise a two-bit uncertainty. In case of additional elements of uncertainty in the strings, the number of uncertainties may additionally increase, e.g. because of signal transfer-, pre- or post-process actions. It is clear that the respective uncertainty in both of the strings can be mapped to the other respectively, e.g. by defining entity specific uncertainties, or universal uncertainty values for each entity of one of the sequences. In the figure there is depicted a single entity of string 2 $a_i$ and a single entity $b_i$ of string 1. The entity $b_i$ of string 1 is comprised of an uncertainty value $\tau$ defining a number of tolerated entities $b_i-\tau$, $b_i+1-\tau$, ..., $b_i-1$, $b_i$, $b_i+1$, ..., $b_i-1+\tau$, $b_i+\tau$. It is to be noted that the 1 and the $\tau$ are used to symbolize a one bit difference in the entity value of $b_i$. In case of music this may represent a halftone or something equivalent or (in dependence of the application) a certain (and maybe $b_i$ dependent) value. It may further be noted that the $\tau$ uncertainty values may be differently weighed for the positive and negative side of the value $b_i$ resulting in a range of $b_i\tau$ to $b_i+y$. The uncertainty value may be calculated or be empirically determined by statistical or systematic errors within the system or the strings.

Figure 8:
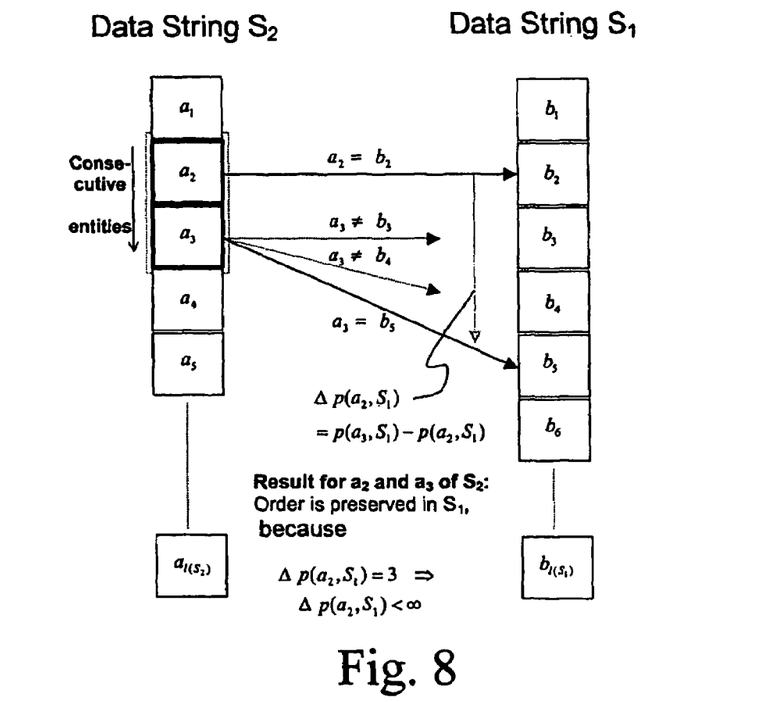
FIG. 8 depicts an example of an improved similarity measure which considers the different possible distances between the entities in the tuples.

FIG. 8 depicts an example of the present invention for an improved similarity measure, considering the different possible distances between the entities in the tuples. For an improved clarity it is assumed that only pairs of entities are used. The distance between the entities in a pair can e.g. be defined by the number of entities between them or by the number of steps between the entities or by the amount of the difference of their absolute positions. The additional distance parameter can be used to determine an additional similarity parameter for matching pairs of entities in the two strings. This parameter can be combined e.g. in a 3-tuple, comprising the two entities and their respective distance. A possible notation could be $(a_i, 5, a_j)$, wherein the $a_i$ refers to a first entity, the $a_j$ refers to the second entity and the 5 refers to the distance or position difference of said entities in their respective data string. In a simple embodiment of the present invention, the number of matching triples can directly be determined by the above comparing algorithm. More sophisticated approaches can consider the difference in the positions as a function of the absolute distance in one of said strings. This can be embodied by an additional normalizing factor such as e.g. (2*difference of the distances)/(sum of the distances of both strings). The exact equation for the determination of the distance difference parameter is not important as long as it is assured that e.g. the division by zero is prevented. The exact equation for the determination of the distance difference parameter can be selected in dependence of the actual similarity problem.

The depicted example depicts the very simple case wherein a pair of directly consecutive entities in string $S_2$ is compared with not directly consecutive entities in String $S_1$. As stated above this simple embodiment can easily be extended to arbitrary pairs or tuples of entities.

Figure 9:
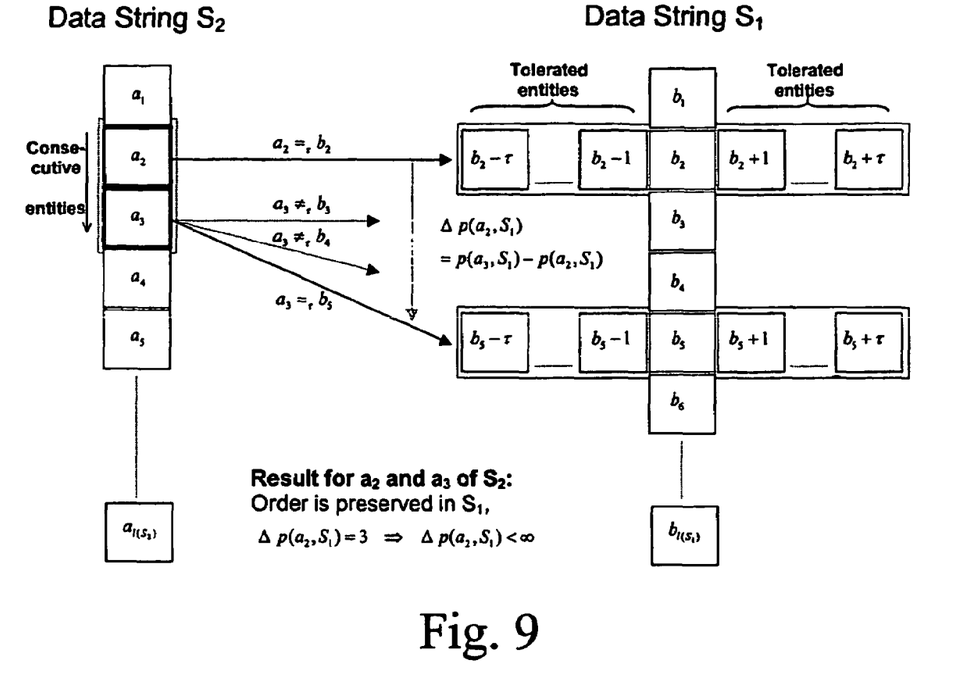
FIG. 9 is an example of a method using the principles of fault tolerance and entity distance according to FIGS. 7 and 8 in one embodiment.

FIG. 9 is an example of a method using the principles of fault tolerance and entity distance according to FIGS. 7 and 8 in one embodiment. If two strings $S_1$ and $S_2$ are to be analyzed for their similarity using the introduced similarity measure every element of $S_1$ and $S_2$ has to be located on a unique position within $S_1$ and $S_2$. In some cases it is unfortunately not possible to comply with this strict requirement, especially in case of similarity measures for strings that are most likely containing faults. This is for example the case for music retrieval systems that retrieve a music song just on the basis of a sung, whistled or hummed search melody which will most likely contain tone height or tone duration errors as well as inserted or omitted tones. The former unique element positions within the strings $S_1$ and $S_2$ become fuzzy as a consequence and a fault-tolerance is to be taken into account for the similarity measure. A fault-tolerant similarity measure for two strings $S_1$ and $S_2$ can thus easily become a combinatorial problem due to the fast increasing number of analytical steps. The following section introduces an improved measure that is adapted to the concerns of a fault-tolerance which is still based on the concept of order relationships. It is capable of tolerating:

1.) additional characters,
2.) omitted characters, and
3.) character deviations (i.e. different character values), if two strings $S_1$ and $S_2$ are to be analyzed for their similarity. The following method has successfully been applied for music retrieval.

If two strings $S_1$ and $S_2$ are analyzed for their similarity one string (e.g. $S_2$) is assumed to be error-free. $S_2$ is then used to estimate the element positions of the other string $S_1$: If an element $a_j$ is located at position j in $S_2$ the corresponding element as of $S_1$ (with $a_i=a_j$) is expected to be located near to j in $S_1$ with $i=j\pm\epsilon$. The more similar the strings $S_1$ and $S_2$, the more subsequent elements $a_j$ and $a_{j+1}$ of $S_2$ are located similar in $S_1$ preserving the order relationship $R_{S2}$ defined by $S_2$.

Let $p(S_1,a_j)$ be the position of $a_j$ (with $a_j \in S_2$) in $S_1$. $p(S_1,a_j)$ is thus defined as $$p(S_1, a_j) = \begin{cases} i & : a_j =_\tau a_i, a_i \in S_{1j} \\ \text{not defined} & : \text{otherwise} \end{cases}.$$

The equivalence ($=_\tau$) of two characters $a_1$ and $a_2$ defines these elements to be equivalent in the scope of a defined $\tau$-fault-tolerance:

$$a_1 =_\tau a_2 \text{ if } \exists 0 \leq t \leq \tau: a_1 \pm t = a_2$$

The distance $\Delta p(S_1,a_j)$ defines the position distance of two subsequent characters $a_j$ and $a_{j+1}$ of $S_2$ in $S_1$:

$$\Delta p(S_1, a_j) = \begin{cases} p(S_1, a_{j+1}) - p(S_1, a_j) & : p(S_1, a_{j+1}) > p(S_1, a_j) \\ \infty & : \begin{cases} p(S_1, a_{j+1}) \text{ or } p(S_1, a_j) \text{ is not defined, or} \\ p(S_1, a_{j+1}) \leq p(S_1, a_j) \end{cases} \end{cases}$$

A heuristic similarity measure $s(S_1,S_2,R_{S_1})$ for two strings $S_2$ and $S_1$ can hence be defined as:

$$s(S_1, S_2, R_{S_1}) = \frac{\sum_{j=1}^{l(S_1)-1} \frac{1}{\Delta p(S_1, a_j)}}{\max_{1 \leq j \leq l(S_2)} p'(S_2, a_j) - \min_{1 \leq j \leq l(S_1)} p'(S_2, a_j)} \cdot \frac{n_c(S_1, S_2)}{l(S_1)}$$

if $a_j \in S_2$, and $n_c(S_1,S_2)$ is the overall number of kept order relationships (of all subsequent characters of $S_2$ in $S_1$).

$$\max_{1 \leq j \leq l(S_2)} p'(S_2, a_j)$$

is the largest position of all $a_j$ in a string $S_2$ without any computation speed-up techniques as explained in the FIG. 6. $p'(S_2,a_j)$ thus reflects the position of $a_j$ in the overall string S (with $S \supseteq S_2$) of which $S_2$ is a sub-string. As a consequence $$\max_{1 \leq j \leq l(S_2)} p'(S_2, a_j) \text{ and } \min_{1 \leq j \leq l(S_2)} p'(S_2, a_j)$$

are defined as:

$$\min_{1 \leq j \leq l(S_2)} p'(S_2, a_j) = 1 \text{ and } \max_{1 \leq j \leq l(S_2)} p'(S_2, a_j) = l(S_2)$$

if no computation speed-up technique is applied as in FIG. 6.

The introduced heuristic similarity measure is capable of tolerating faults that are caused by wrong characters, inserted and omitted characters. This measure is capable of recognizing a (faulty) string clearly in a huge set of strings. The higher the value of $s(S_1,S_2,R_{S_2})$, the more similar are the compared strings. If a string $S_2$ is to be retrieved in a huge set of strings, the string $S_1$ with the highest value $s(S_1,S_2,R_{S_2})$ is the most potential candidate to be the most similar one to $S_2$. The concept of $s(S_1,S_2,R_{S_2})$ is still based on the evaluation of kept order relationships.

The fuzzy similarity algorithm can be employed in a variety of technical systems where a sequence of symbols or quantized values is compared with a second sequence of symbols to find the locations of highest similarity. In the following four typical applications are sketched:

Associative Text String Search

The algorithm can be used to implement an associative text search since not only exact matches can be found. Those imperfect matches have a similarity below 1. An end user could define the fault tolerance level by adjusting a similarity threshold which has to be exceeded to report a match: The user can start with perfect match (allowing insertions of characters in the reference string, but no deletions) and if no result is found lower the threshold to get more results. Alternatively the matches could be displayed sorted according to decreasing similarity showing the most similar ones at first rank.

Musical Melody Search

A polyphonic piece of music consists of several different voices, each of which is characterized as a sequence of notes. Those notes can be regarded as quantized values with tone height and length. The robust similarity measure is applied to the problem of detecting a hummed or sung melody (i.e. a sequence of notes) in a music database of several pieces of music. Once a piece of music is found where the search melody is found with high similarity it is presented to the user for playback purposes. This application is of high relevance for entertainment terminals where the identification of pieces of music does not have to be done by entering a text (i.e. title, composer or performer), but by singing a prominent (e.g. the refrain) or an arbitrary part of the music.

Genome Analysis

Genomic signal processing is often concerned with finding DNA (deoxyribonucleic acid) sequences on longer strands of DNA consisting of the adenosine, thymine, cytosine or guanine (A, T, C and G) nucleotides. Thus a DNA strand can be described as a sequence of the symbols A, T, C and G. Identical, but also similar DNA sequences which differ at certain positions can be found by the above mentioned robust search algorithm. This similarity comparison is even more pronounced in the case that the sequences are long, as is typically the case in DNA analysis with thousands of nucleotides. The application of the present invention to the genome sequence identification is a good example for a search algorithm wherein the fragmentation has nearly no effect, as the low number of entities (4) makes it improbable, that a sequence occurs not having a nearly even distribution of nucleotides. The Genome analysis on the other hand discloses aspect of the entities, instead of the 4 nucleotides itself, the 20 nucleotide-coded amino acids can be selected do describe and compare the sequences, wherein one entity is represented by one or more 3-tuples of nucleotides. It may be noted that in the case of genome analysis on the basis of the DNA, the speed up techniques like fragmentation and entity recognition can not be applied, as it is very likely that e.g. in a 200 entity sequence, the single nucleotides are more or less evenly distributed. So it can be assumed that fragmentation techniques can not help to speed up the recognition process. In the case of nucleotide based string analysis, it would also be not applicable to provide a toleration of a faulty value for the single nucleotides, because it is not clear, which one is the "nearest" nucleotide for e.g. Tymine. In case of an RNA triplet analysis, the nucleotide triplets are each coding an amino acid. The triplets can provide a sequence as 4*4*4=64 triplets are coding only 20 different amino acids or commands. In this case, it is clear that e.g. UUA, UUG, CUU, CUC, CUA and CUG code the same amino acid leucin and can therefore be regarded as equal. To apply the present invention on these triplets, the pairs of amino acids or triplets are chosen like the following (GAU, UAC) defining the order of Aspargin followed by Tyrosine or as the pair (asp, tyr) to be compared in two RNA strings. Speech recognition (see FIG. 10).

Figure 10:
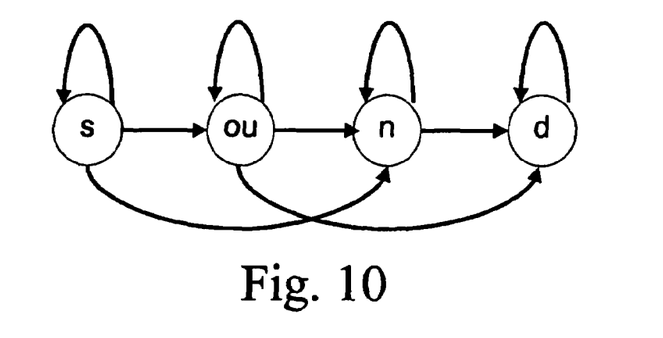
FIG. 10 shows a hidden Markov model for speech recognition of word "sound" with state transitions.

FIG. 10 depicts an exemplary speech recognition application of the present search algorithm on the example of the hidden Markov model (HMM) for speech recognition of the word "sound" with state transitions. In speech recognition the phonetic sounds and their transitions in words are commonly modeled by hidden Markov models (HMM): During a short time window the spectral characteristics of are analyzed and mapped to the most similar phoneme. The spectral changes while articulating a word lead to transitions between the corresponding HMM phoneme states. Normally, the word is recognized which shows the most similar state transition sequence compared to the acoustical input. The computation of the most similar sequence of phonemes is often done by dynamic programming.

This is an ideal case for applying the fault-tolerant similarity algorithm since it copes well with the time variations while articulating a word and substitutes the dynamic programming approach: Some of the sounds are encountered longer or shorter compared to the reference recordings (loop back arrows), the normal sequence s->ou-2>n->d can be encountered or some sounds can even be skipped (arrows which bypass states). The number of states is on the order of several dozen states per language, one state is considered to be stable for at least 10 ms. The discrete nature of the phoneme states and the variability of sounds fit very well to the robust order recognition search paradigm of the present invention.

Figure 11:
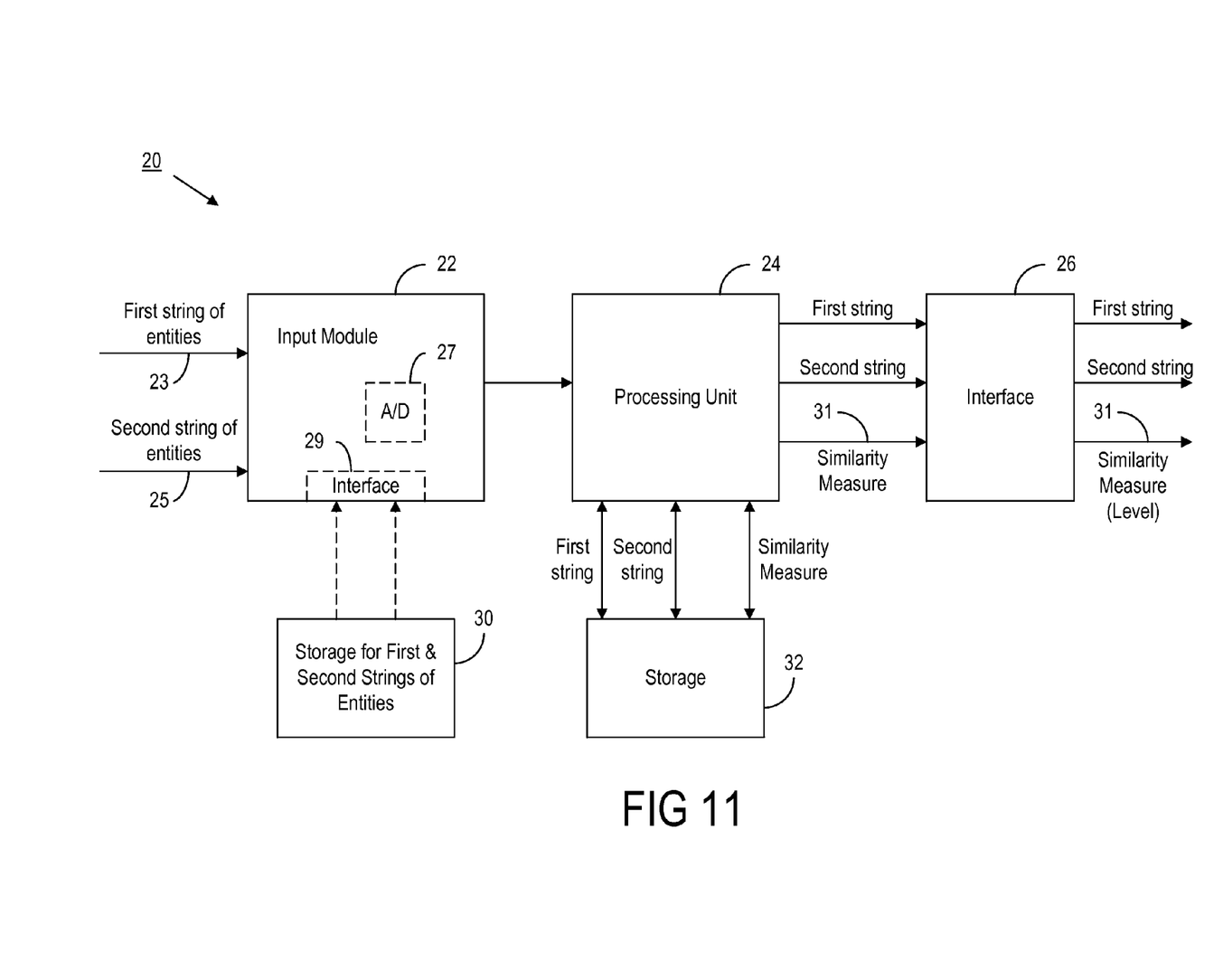
FIG. 11 is a block diagram of an electronic device for determining the similarity between two data strings of data entities according to the present invention.

FIG. 11 illustrates an electronic device 20 for determining the similarity between the two data strings of data entities. The electronic device comprises a receiving component (input module) 22 for receiving, a processing unit 22, and an interface 24.

The component (input module) 22 for receiving is for receiving a first string of entities 23 and a second string of entities 25. The component for receiving can be embodied as a single interface or input module or as two different interface (input) modules for receiving said two strings. The interface module can further comprise a quantifier such as an analog digital converter 27 to provide a string even from an arbitrary analogue signal. The component for receiving can also comprise an interface 29 to receive said first or second signal from a storage 30.

The processing unit 24 is connected to said receiving component (input module) 22. The processing unit is configured to determine at least (one tuple of) consecutively following data entities in both of said strings. Said processing unit is further configured to determine the relative position of said at least one tuple of consecutively following data entities in both of said data strings. Said processing unit is configured to determine a matching measure by comparing how far the relative positions of the at least one tuple of similar consecutively following data entities in said second data string matches with the relative position of said at least one tuple of consecutively following data entities in said first data string. Said processing unit is further configured to output a similarity measure 31 which corresponds to the matching measure of at least one comparison result. The processing unit can further be configured to execute the processes of the preceding description.

The interface 26 is connected to said processing unit for outputting said similarity level 31. The interface can further serve for outputting said first and/or second string. The interface can also serve for outputting said strings.

Yet another example embodiment of the electronic device further comprises a storage 32 that is connected to said processing unit for storing received strings and said determined levels of similarity. The storage can also be used to retrieve pre-stored strings from.

This application contains the description of implementations and embodiments of the present invention with the help of examples. It will be appreciated by a person skilled in the art that the present invention is not restricted to details of the embodiments presented above and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method comprising:

receiving a first data string in an electronic component, receiving a second data string in said electronic component, determining pairs of consecutively following data entities in said first data string in a processing unit, determining the relative positions of said pairs of consecutively following data entities in said first data string in said processing unit, allocating a position label to each of said data entities in the first data string in said processing unit, numbering same data entities according to their relative position in accordance with the position label in said processing unit, determining similar data entities with the same order in said second data string in said processing unit, determining the relative positions of said determined data entities in said second data string in said processing unit, determining a matching measure by determining how far the relative positions of data entities in said second data string match with the relative positions of consecutively following data entities in said first data string in said processing unit, and determining a similarity measure which corresponds to the matching measure of at least one comparison result in said processing unit, repeating said determination of said similarity measure with a number of received second data strings in said processing unit, and outputting by an interface said determined similarity measures for said data strings according to the amount of similarity to said first data string, wherein said first data string of entities and said second data string of entities are data strings relating to one of associative text string, genome analysis, speech recognition, and musical melody.

2. The method according to claim 1, further comprising:
determining at least one error limit for at least one of said entities, and
considering said at least one error limit during said determination of said matching measure.

3. The method according to claim 1, further comprising:
determining a first distance between said two data entities of consecutively following data entities in said first data string,
determining a second distance of said two data entities determined in said second data string,
determining a difference between said first and second distances, and
considering said difference during said determination of said matching measure.

4. The method according to claim 1, further comprising:
storing said second string together with said similarity measure.

5. The method according to claim 1, further comprising:
determining a threshold for said similarity measure, and
outputting said second string, if said determined similarity measure at least equals said threshold.

6. The method according to claim 1, further comprising:
analyzing the first string for entities not present in the first string, and
suppressing in the second string all said entities not present in said first string.

7. The method according to claim 6, further comprising:
determining the number of entities that are present in the second string, but are not present in the first string, as a second similarity measure.

8. The method according to claim 7, further comprising:
determining a section within said second string comprising at least the same number of entities that are simultaneously present in both strings.

9. A computer readable medium stored with code, which when executed by a computer, performs the method of claim 1.

10. The method according to claim 1, wherein the first data string and the second data string are pieces of text.

11. The method according to claim 1, wherein the first data string and the second data string are each a sequence of musical notes.

12. The method according to claim 1, wherein the first data string and the second data string are sequences of deoxyribonucleic acid.

13. The method according to claim 1, wherein the first data string and the second data string are each phonetic sounds.

14. An electronic device comprising:
a component configured to receive a first data string of entities and a second data string of entities, said first data string of entities and said second data string of entities being data strings relating to one of associative text string, genome analysis, speech recognition, and musical melody,
a processing unit configured to
determine pairs of consecutively following data entities in said first data string,
determine the relative positions of said pairs of consecutively following data entities in said first data string,
allocate a position label to each of said data entities in the first data string,
number same data entities according to their relative position in accordance with the position label;
determine similar data entities with the same order in said second data string,
determine the relative positions of said determined data entities in said second data string, and
determine a matching measure by determining how far the relative positions of data entities in said second data string match with the relative positions of consecutively following data entities in said first data string, and
repeat said determination of said similarity measure with a number of received second data strings, and
an interface configured to output a similarity measure for said second data string and said number of second data strings according to the amount of similarity to said first data string.

15. An electronic device according to claim 14, further comprising a storage configured to store received strings and said determined similarity measures.

16. The electronic device according to claim 14, wherein the electronic device is a mobile terminal device.

* * * * *